United States Patent [19]

Chung

[11] Patent Number: 4,989,367
[45] Date of Patent: Feb. 5, 1991

[54] METHOD AND APPARATUS FOR GERMINATING SEED SPROUTS

[76] Inventor: Huy Chung, 11950 Pierrefonds Blvd., Apt. 417, Pierrefonds, Que. H9A 2X5, Canada

[21] Appl. No.: 448,266

[22] Filed: Dec. 11, 1989

Related U.S. Application Data

[63] Continuation-in-part of Ser. No. 260,305, Oct. 20, 1988, Pat. No. 4,926,598.

[51] Int. Cl.$^5$ ............................................. A01C 1/02
[52] U.S. Cl. .......................................... 47/61; 47/62; 47/16
[58] Field of Search ..................... 47/60, 61, 62, 14, 16

[56] References Cited

U.S. PATENT DOCUMENTS

| | | |
|---|---|---|
| 987,805 | 3/1911 | von der Kammer . |
| 1,454,422 | 5/1923 | Abe . |
| 1,922,147 | 8/1933 | Wales . |
| 2,296,849 | 9/1942 | Hammerstrom et al. . |
| 2,725,673 | 12/1955 | Perin . |
| 2,897,631 | 8/1959 | Howsley, Sr. et al. . |
| 2,917,867 | 12/1959 | Bailey . |
| 3,327,425 | 6/1967 | Dosedla et al. . |
| 3,643,376 | 2/1972 | Poindexter et al. . |
| 4,821,455 | 3/1989 | Omente . |

FOREIGN PATENT DOCUMENTS 1115958 12/1982 Canada .
1356990 2/1964 France .

OTHER PUBLICATIONS

"The Germination of Seeds"-Mayer & Poljakoff-Mayber, published prior to 1980-pp. 42–49, 90 & 91 & 194 & 195.

Primary Examiner—Henry E. Raduazo
Attorney, Agent, or Firm—Shlesinger & Myers

[57] ABSTRACT

An apparatus and a method to provide accelerated germination of seed sprouts specifically mung beans. The seed sprouts are placed in a closed vessel, soaked and then have air blown through a layer of seeds and showered at predetermined intervals. The method comprises forming a layer of seeds on a screen in an enclosed vessel, soaking the seeds with water plus additives, then humidified air is blown through the layer of seeds, and water plus additives are sprayed at intervals while the air is being blown through the vessel. Temperature of the vessel is controlled during the operation by heating both air and water sprayed onto the seeds.

3 Claims, 3 Drawing Sheets

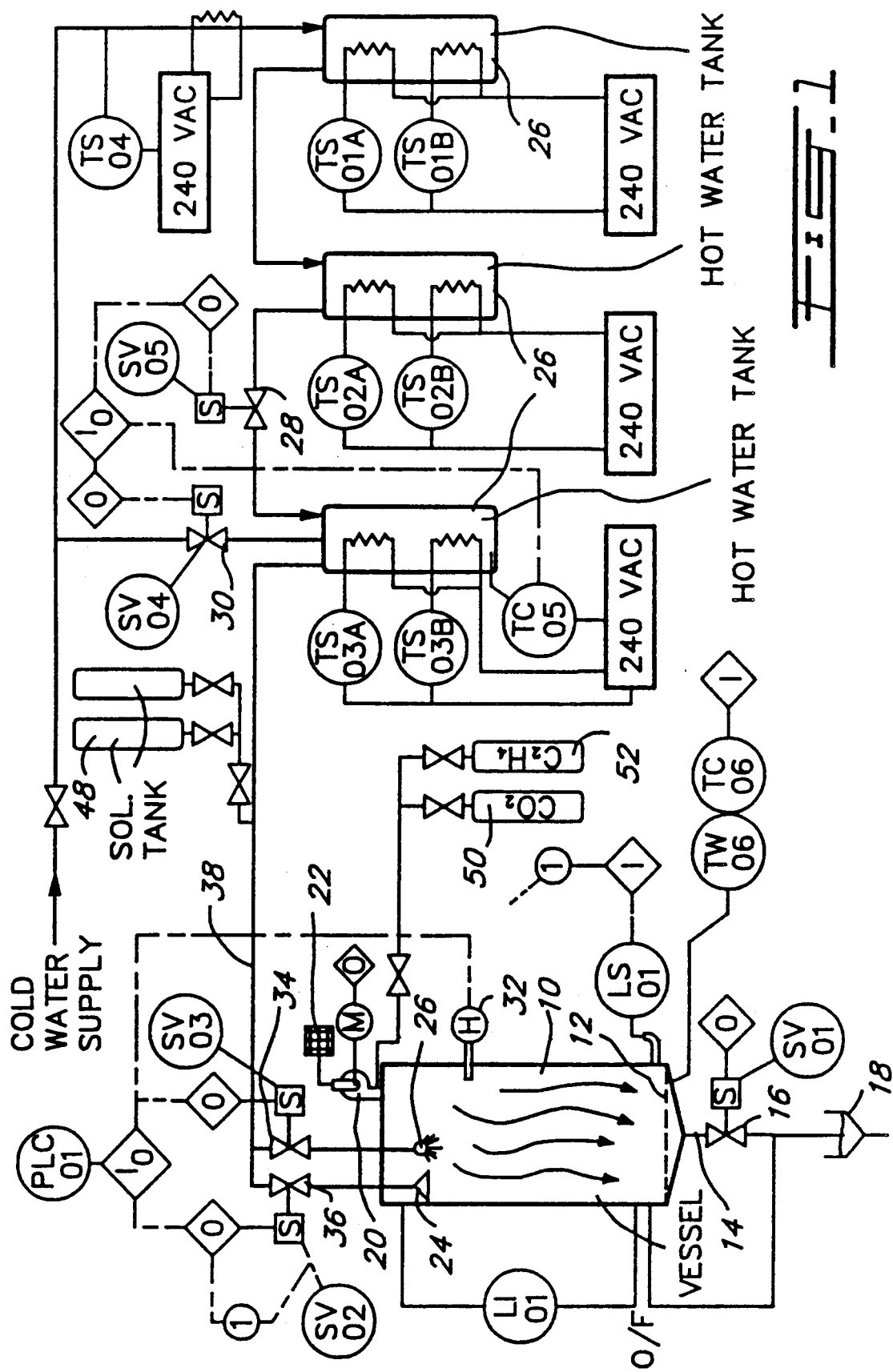

METHOD AND APPARATUS FOR GERMINATING SEED SPROUTS

CROSS-REFERENCE TO RELATED APPLICATIONS

This application is a continuation-in-part of application Ser. No. 260,305 filed 10/20/88 and now U.S. Pat. No. 4,926,598.

The present invention relates to accelerated germination and growth of seeds, such as beans. More specifically, the present invention provides an apparatus suitable for accelerated germination of seed sprouts, particularly mung bean sprouts, and also a method wherein bean sprouts are germinated in a complete climate controlled condition.

The process of germinating seeds and growing bean sprouts in the open has always been subject to variables such as temperature, rain, soil conditions, to name but a few. Thus growing beans or seeds outside has been a lengthy process. Over two thousand years ago mung beans were sprouting on river banks in Southern China. Improvements in agriculture have resulted in nutrients added to the soils, watering the seeds and other controlled processes. In recent years, mung beans are piled into containers to a height of about 3 feet, presoaked and left to dry for a period of time. The beans are then showered every four or five hours, every day for five or six days. The beans germinate and the sprouts grow to a length of two to three inches, ready for use. However this process uses a lot of water.

Various attempts have been made to grow seed sprouts, particularly mung bean sprouts, in controlled atmospheres, one example of such a method is disclosed by Poindexter et al., in U.S. Pat. No. 3,643,376. In this patent, the seeds are germinated within a confined treating zone, in the presence of a fine mist or fog of water above the seed bed. Air is not blown through the treating zone. Another method of soiless plant cultivation is disclosed by Perin, in U.S. Pat. No. 2,725,673. In this method, heated air is blown over a series of trays, or receptacles, within a closed container. The air is humidified, but there is no provision for spraying water on the seeds.

In the present invention, an apparatus and a method are disclosed which utilizes air circulation and water spray at predetermined intervals to germinate and grow bean sprouts. By commencing the process with a soaking step, controlling temperature within the enclosure, adding the necessary hormones and minerals in the water sprays, one is able to germinate bean sprouts within a short period of time and bring them to a commercial size.

It is an aim of the present invention to provide a controlled process for germinating seeds, such as mung beans, alfalfa, radis, etc., to provide a higher yield per square inch and per pound of seeds. Generally the saleable product is produced in a shorter time than existing processes, only three of four days, and completely controlling the environment containing the seeds, a more consistent product is obtained having better quality and longer self life.

The present invention provides a method of germinating seed sprouts, comprising the steps of forming a substantially uniform layer of seeds on a screen in an enclosed vessel, soaking the seeds in the vessel for a predetermined time in water plus mineral and hormone additives, draining the water plus mineral and hormone additives from the vessel, providing a flow of air within a predetermined temperature range through the layer of seeds in the vessel, maintaining the air in the vessel at about 100 percent humidity, spraying the layer of seeds with water plus mineral and hormone additives during intervals while providing the flow of air in the vessel, the spraying occurring for periods of time to ensure the seeds remain within a predetermined temperature range, and continuing the flow of air in the vessel until the seed sprouts have grown to a predetermined size.

In another embodiment, an apparatus is provided for accelerated germination of seeds comprising an enclosed vessel having a screen in a lower portion of the vessel to hold a layer of seeds, the vessel having a drain in the lower portion below the screen, a shower at the top of the vessel to spray water from a water supply onto the screen, water heater with water temperature sensing device and a controller to control temperature of the water supply to the shower, an air supply system having an air heater to supply air through an air inlet at the top of the vessel, the air flowing downwards and exiting through the drain, air temperature sensing device in the vessel and controller to control the air temperature in the vessel, moisture producer in the vessel with humidity measuring device and controller to control humidity in the vessel, and sequence controller to control a soaking step and an air flow step with intermittent spraying from the shower.

In drawings which illustrate embodiments of the invention:

FIG. 1 is a diagrammatic illustration of one form of apparatus for germinating seed sprouts according to the present invention;

Figures 2, 3:
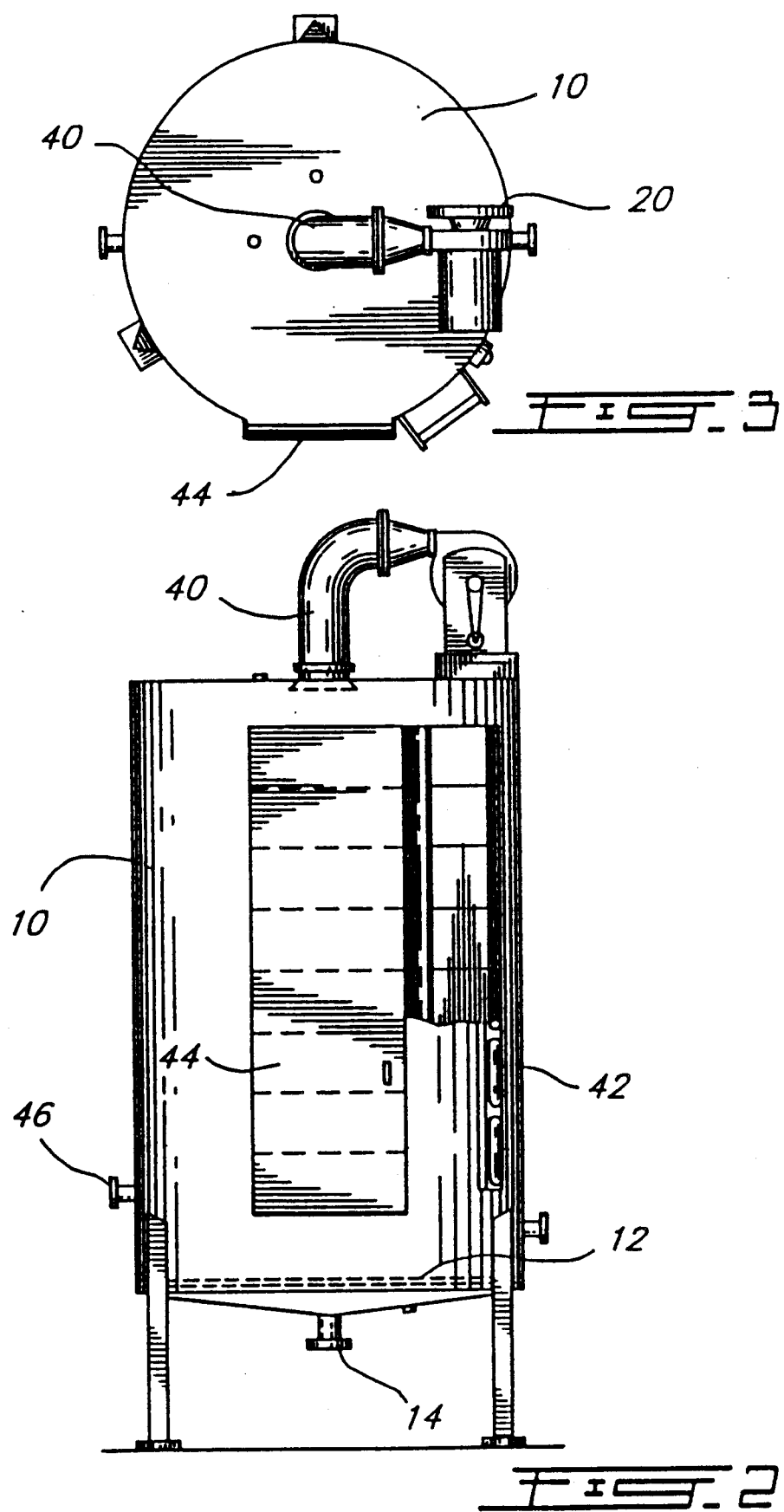
FIG. 2 is a side elevation showing an enclosed vessel according to one embodiment of the invention for containing seed sprouts during the germination process.
FIG. 3 is a top view of the vessel shown in FIG. 2.

FIG. 1 illustrates, diagrammatically, an apparatus for germinating seed sprouts including an enclosed vessel 10, which has at its base a screen 12 on which a layer of seeds is spread. Beneath the screen 12 is a drain line 14 having a discharge valve 16 to close the drain and a vented drain 18 to permit air to exit from the vessel 10. A centrifugal fan 20 with a heater 22 therein is provided on top of the vessel 10 also a shower head 24 for spraying water onto the screen 12 and an atomizer 26 providing mist or fog to control humidity in the vessel.

Three hot water tanks 26 are shown in the diagram with thermostats to control the temperature. A hot water control valve 28 and a cold water control valve 30 are controlled by a programmable controller to ensure that the temperature of the water fed into the vessel is in the range from 25° to 28° C.

A humidity measurement device or humidistat 32 measures the humidity within the vessel 10 and a controller activates a solenoid valve 34 to the atomizer 26. The humidity within the vessel is controlled to be at about 100 percent during the air flow cycle. Operation of the shower 24 is by another solenoid valve 36 from the water line 38.

FIGS. 2 and 3 illustrate one example of a vessel 10 having a fan 20 mounted on top of the vessel with a duct 40 directed downwards at the center of the vessel 10. A sight glass 42 extends for the height of the vessel so that the level of germinated seeds can be seen. A door 44 with a number of removable panels is provided. The door 44 may be opened and the panels removed one at a time from the top to ensure that the germinated beans do not fall out of the vessel. An overflow pipe 46 is provided above the screen 12 in the vessel 10 to ensure that the level of water does not rise in the vessel 10 during the soaking stage.

As shown in FIG. 1, two hormone and mineral solution tanks 48 are provided with solenoid valves feeding into the water line 38. This provides for controlled introduction from either of the two tanks. Whereas the solution is shown feeding into water line 38 which in turn feeds the shower 24 and atomizer 26 or the shower 24 line rather than the main line. Two tanks 48 are shown, but more or less may be used with the valves being controlled by the control system.

A carbon dioxide cylinder 50 and an ethylene gas cylinder 52 are shown feeding into the air supply system. Valves are provided to control the quantities of gases to be added to the air from the fan 20.

In operation, mung beans or other seeds, are washed and placed on the screen 12 in the enclosed vessel 10. In one embodiment, the vessel 10 is approximately six feet in diameter and has a height above the screen 12 of at least seven feet. The beans are spread evenly on the screen 12, approximately six inches deep which in the specific size of vessel described is approximately 300 pounds of beans. The discharge valve 16 is closed and water is fed into the vessel 10 through the shower 24 until the level of the water is approximately 12 inches above the screen 12, completely covering the beans. As well as water, small amounts of minerals and hormones, preferably kenitin, in the order of one part per million, are added from tanks 48 to accelerate growth of the beans. The soaking time for the beans is from about five to six hours. In other embodiments where other types of beans are used it may be as high as about twelve hours. During the soaking period the water is changed at least three times. It is preferable to have clean water because the water becomes tinted when the beans are soaked and it is necessary to remove the tinted water from the beans. This tinted water is produced from the dolmen of the beans and is preferably removed because in certain cases may cause problems during the germination of the beans.

Different types of minerals may be introduced with the water for soaking the beans, in one embodiment magnesium sulphate, potassium chloride, calcium chloride and potassium phosphate are mixed with distilled water. Kenitin is dissolved in ethanol and then mixed with the mineral solution and approximately one part per million of the mineral and hormone solution is mixed with the water for soaking the beans. One of the reasons for the mineral additives is to ensure that the water has a hardness in the range of about 2 to 8 percent. Excessively hard water may restrict germination. During the time that the water is added to the vessel 10 for the soaking stage, the temperature of the water is controlled to approximately 30° C.

After the soaking stage, the water is drained from the vessel 10 and the fan 20 is turned on. The heater heats the air so that the temperature of the air entering the vessel through duct 40 keeps the bean sprouts in the temperature range of 25° to 28° C. If the bean sprouts during germination rise much above 28° C., fungus growth can occur or the beans may die. If the heat drops much below 25° C. then the process of germination slows down. Air flow through the fan as it enters the vessel 10 has a velocity of approximately 2 meters per second and a pressure build up occurs in the vessel of about 2 inches of water static pressure. Air flows downwards through the layer of beans on the screen 12 and exits through the drain line 14 venting at the vented drain 18. No recirculation of the air occurs.

During the air flow cycle the atomizer 26 provides a fog or mist so that the humidity within the vessel is approximately 100 per cent. The humidistat 32 controls the operation of the atomizer 26. Whereas an atomizer is shown in the diagram it will be apparent to those skilled in the art that steam could be supplied to the vessel so the humidity within the vessel 10 is kept at about 100 per cent.

The air entering the vessel 10 through the duct 40 has carbon dioxide up to 10 percent by volume added from cylinder 50 and ethylene gas up to approximately 1 part per million added from cylinder 52. Oxygen attacks the enzyme of the bean sprout and the carbon dioxide prevents oxidation of the sprout and keeps it white. Ethylene activates the sprouts lengthen and thicken the shoots. The ethylene also activates growth of the sprouts. If the ethylene content is much in excess of 1 part per million, then the sprouts can die.

Approximately every 12 hours the water shower 24 is turned on for approximately 15 minutes. There is a temperature sensing device adjacent the layer of beans on the screen 12 and if the temperature appears to rise above 28° C., then the shower 24 is automatically turned on. The temperature of the germinating beans is not permitted to rise much above 28° C. as temperatures in excess of this can cause the beans to die. The shower water is at a temperature in the range of approximately 25° to 28° C. but not higher than 28° C. Minerals are generally added to the water to control acidity and hardness. The mineral content of the water is the same as the water used for the soak stage. A hormone is mixed with the shower water to improve germination.

Several hormones may be used, however kenitin is preferred for the soak stage for mung beans and also for the initial shower stage during the first day. Kenitin hormone increases growth of the root. The root of the bean sprout is seen at the end of the white shoot and of the bean, if too great a quantity of kenitin is used then the root grows longer than the shoot which is not desirable. The shoot is the white portion of the bean sprout, and in order to make the shoot grow long, another hormone known as I.A.A. (3-indoleacetic acid) is added. This hormone assists growth of the shoot and fattens the shoot. The I.A.A. and kenitin cannot be added at the same time, but are added at different shower times with the I.A.A. being applied after the kenitin. Once the root has grown, then it is no longer necessary to shower with kenitin, the root must grow first but then it is necessary for the shoot or body of the sprout to grow. In both cases, the hormone is added in the same solution as the mineral additives and in a quantity of not more than 1 part per million.

The bean sprouts germinate in approximately three days, and in some cases four days depending on the required length of the sprout. A two inch sprout takes about three days and for a three inch sprout about four days are needed. In day one, the shower water has only the kenitin hormone. Day two commences with the kenitin hormone in the shower water and ends with the I.A.A. hormone and in day three no hormone additive is included in the shower water. However if there is a four day cycle then in day three one shower with kenitin and one shower with I.A.A. may be applied. The I.A.A. is dissolved in ethanol before being mixed with the mineral solution. Concentrated solutions of the mineral and the hormone additives are prepared in advance so that they can be used for showers and also for the soak cycle.

The shower head 24 for the vessel 10 of approximately 6 feet diameter has a flow of approximately 5 gallons per minute and, as can be seen in FIG. 1, there are three hot water tanks. The use of three tanks is a matter of choice, a domestic hot water tank is considerably cheaper than commercial hot water systems. By utilizing three easily available household domestic hot water tanks and the control system which allows the cold water to mix with the last hot water tank, one is able to exactly control the temperature of the water leaving in water line 38 so that it is within the range of 25° to 28° C. By utilizing a programmable control system, it is simply necessary to place the layer of bean sprouts on the screen 12 in the vessel 10, close the door 44 and press the start button, wherein the controller controls the complete process for three or four days. This includes the soak cycle, followed by the air flow cycle. The temperature of the water, the temperature of the air within the vessel, the times for the soak cycle, air cycle and the spraying at the desired intervals are all preprogrammed from the controller. Different types of seeds or beans may require the controller to be reprogrammed, different hormone or mineral additives may be added dependent upon the requirements, in some cases tap water must be adjusted by the addition of different minerals depending upon the hardness and Ph of the tap water.

A preservative may be added to the bean or seed sprouts when the germination has occurred and immediately prior to harvesting, to prevent or at least minimize oxidation of the sprouts after leaving the germinator. In one embodiment the preservative is a meta bisulfate and is mixed with cold water, preferably ice cold water and sprayed onto the germinated sprouts.

Whereas one vessel has been shown, three, four or more vessels may be provided in the same area so that the commencement of the process is staggered, providing a batch of germinated sprouts produced every day from at least one vessel. If more vessels are provided, then batches may be provided at more frequent intervals.

In the previously described embodiment, after the completion of the various steps which cause the seeds to germinate, an air current is established in the germinator flowing through the germinated seeds for a predetermined period of time. It has been found that in certain instances, flowing air solely through the mass of germinated seed may be detrimental to the quality of the final product as the sprouts may be excessively oxydated.

Figure 4:
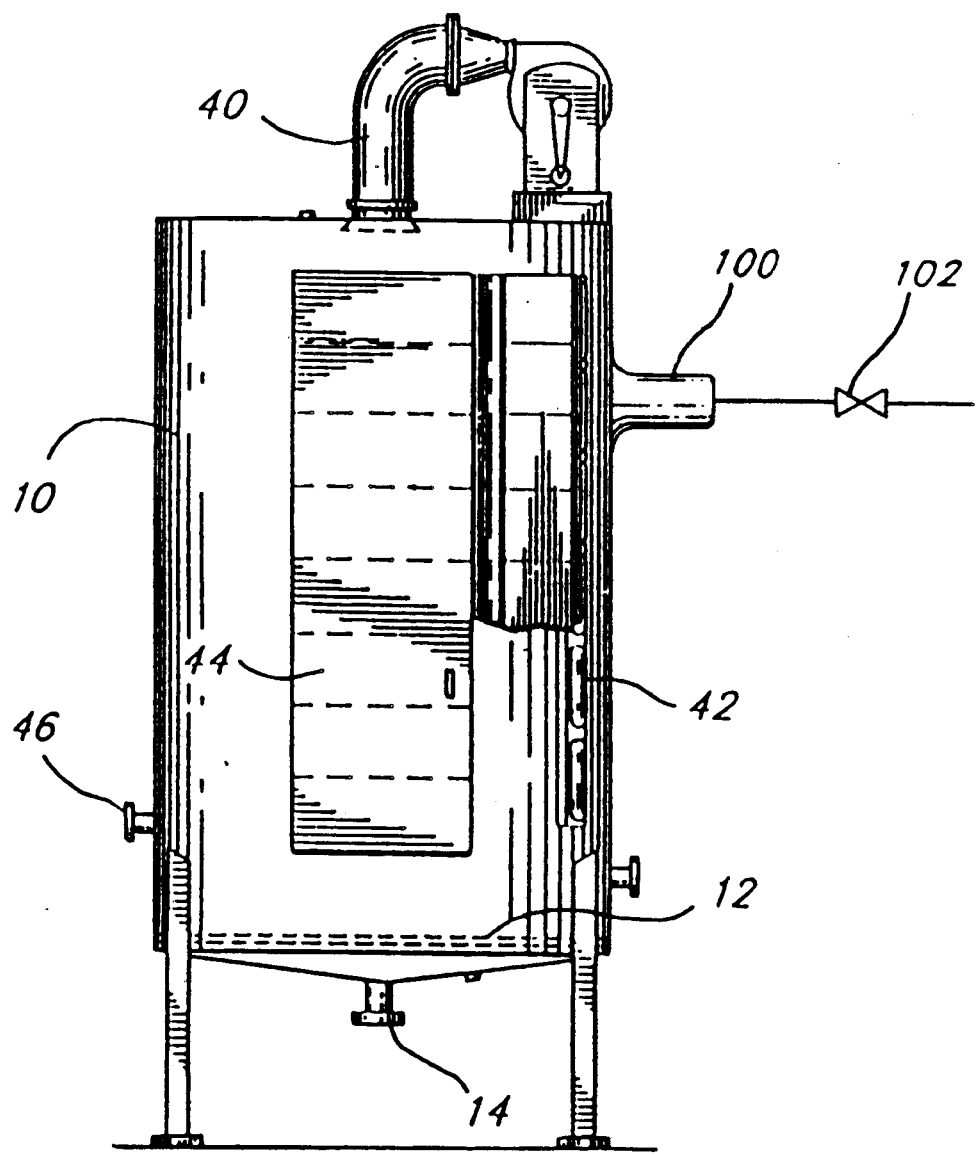
FIG. 4 is a diagrammatic illustration of a variant of the apparatus according to the invention.

In order to solve this problem the germinator in accordance with the invention is provided with a bypass in the air circuit which allows to provide a ventilation above the layer of germinated seeds while preventing the direct passage of air through the layer of germinated seeds. This embodiment is depicted in FIG. 4.

The germination vessel 10 is provided somewhere at mid-height with an air vent 100 normally maintained closed by a valve 102 operated by the programmable controller of the system. There is no provision to recirculate the air leaving the vent 100.

The embodiment illustrated in FIG. 4 operates as follows. The steps leading to the germination of the seeds are carried out normally as described with relation to FIGS. 1, 2 and 3. When the seeds germinate, air flow is established in the vessel 10 flowing along its longitudinal axis and passing through the germinated seeds. After a predetermined period of time which is selected in accordance with the specific application, the valve 102 is opened allowing the air to leave the vessel 10 immediately above the bed of germinated seeds.

This method allows to reduce the oxydation of the sprouts which permits to obtain a higher quality product.

Various changes may be made to the embodiments described herein without departing from the scope of the present invention which is limited only by the following claims.

I claim:

1. An apparatus for accelerated germination of seeds comprising:
    an enclosed vessel having a screen in a lower portion of the vessel to hold a layer of seeds, the vessel having a drain in the lower portion below the screen,
    a shower at the top of the vessel to spray water from a water supply onto the screen,
    water heating means with water temperature sensing device and means to control temperature of the water supply to the shower,
    an air supply means having an air heating means to supply air through an air inlet at the top of the vessel, the air flowing downwards and exiting through the drain,
    air temperature sensing device in the vessel and means to control the air temperature in the vessel,
    moisture producing means in the vessel with humidity measuring device and means to control humidity in the vessel,
    sequence control means to control a soaking step and an air flow step with intermittent spraying from the shower; and
    a bypass vent on said vessel.

2. An apparatus as defined in claim 1, wherein said bypass vent is located above a layer of germinated seeds in said vessel.

3. An apparatus as defined in claim 2, further comprising valve means for controlling the air flow through said bypass vent.

* * * * *